United States Patent
Wittenberg et al.

(10) Patent No.: US 7,854,382 B2
(45) Date of Patent: Dec. 21, 2010

(54) LIGHT COLLECTION ASSEMBLY WITH SELF-RETAINING LENS IN ELECTRO-OPTICAL READER

(75) Inventors: Carl Wittenberg, Water Mill, NY (US); Igor Vinogradov, Bay Shore, NY (US); Mark Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 782 days.

(21) Appl. No.: 11/897,485

(22) Filed: Aug. 30, 2007

(65) Prior Publication Data

US 2009/0057405 A1 Mar. 5, 2009

(51) Int. Cl.
*G06K 7/10* (2006.01)
(52) U.S. Cl. ..................... 235/454
(58) Field of Classification Search ................. 235/454, 235/462.32, 470, 472.01
See application file for complete search history.

(56) References Cited

U.S. PATENT DOCUMENTS

| | | | |
|---|---|---|---|
| 4,251,798 A | 2/1981 | Swartz et al. |
| 4,369,361 A | 1/1983 | Swartz et al. |
| 4,387,297 A | 6/1983 | Swartz et al. |
| 4,409,470 A | 10/1983 | Shepard et al. |
| 4,760,248 A | 7/1988 | Swartz et al. |
| 4,896,026 A | 1/1990 | Krichever et al. |

*Primary Examiner*—Seung H Lee

(57) ABSTRACT

An assembly for collecting light from indicia includes a chassis having a port through which the light from the indicia passes, and walls bounding an interior compartment. A self-retaining frame constituted of an optical material is non-adhesively mounted within the compartment in an assembled position. The frame has an integral lens optically aligned with the port in the assembled position for optically modifying the light passing through the port, and a plurality of legs in gripping frictional interference engagement with the walls in the assembled position. A sensor is optically aligned with the lens, for sensing the light optically modified by the lens.

22 Claims, 3 Drawing Sheets

LIGHT COLLECTION ASSEMBLY WITH SELF-RETAINING LENS IN ELECTRO-OPTICAL READER

BACKGROUND OF THE INVENTION

Various electro-optical readers have previously been developed for reading both one- and two-dimensional bar code symbols appearing on a label, or on a surface of a target. The bar code symbol itself is a coded pattern of indicia. Generally, the readers electro-optically transform graphic indicia of the symbols into electrical signals, which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

Moving beam electro-optical readers have been disclosed, for example, in U.S. Pat. No. 4,251,798; No. 4,369,361; No. 4,387,297; No. 4,409,470; No. 4,760,248; and No. 4,896,026. Typically, a laser beam is directed toward a one- or two-dimensional coded symbol. The laser beam is repetitively swept in a scan line or a series of scan lines across the symbol for reflection therefrom by means of motion of a scanning component, such as a scan mirror. A sensor or photodetector, together with a collection lens assembly comprised of one or more lenses, capture and detect laser light reflected or scattered from the symbol. The sensor generates an electrical analog signal indicative of the laser light returning from the symbol. Electronic control circuitry and software decode the analog signal into a digital representation of the data represented by the symbol that has been scanned. The binary data may then be converted into the alphanumeric characters represented by the symbol. The data may be decoded locally or sent to, and decoded in, a remote host for subsequent information retrieval.

Both one- and two-dimensional symbols can also be read by employing imaging readers having a solid-state imager which includes a one- or two-dimensional array of cells or photosensors which correspond to image elements or pixels in a field of view of the imager. A collection lens assembly comprised of one or more lenses captures either ambient light reflected or scattered from the symbol in the case of a brightly lit environment, or illumination light directed at the symbol for reflection and scattering therefrom in the case of a dimly lit environment in response to actuation of a trigger. The captured light is directed to the imager, which may advantageously be a one- or two-dimensional charge coupled device (CCD) or a complementary metal oxide semiconductor (CMOS) device and includes associated circuits for producing electronic signals indicative of the captured light and corresponding to a one- or two-dimensional array of pixel information over the field of view. The electronic signals may be processed by a microprocessor either locally or sent to, and processed in, a remote host to read the symbol from the captured light.

As advantageous as such moving beam and imaging readers are in capturing data as stand-alone data capture systems, such a reader can be a relatively large and expensive component in assembly and manufacture, especially if it is installed in an apparatus in which the reader is a subsystem. For example, a coffee maker is an example of an apparatus in which the reader may be installed to read symbols on packets of coffee in order to instruct the coffee maker how to brew a particular packet. The reader is a subsidiary system in the coffee maker and, therefore, its design must be optimized such that its size, as well as its assembly and manufacturing costs, are minimized.

It is known to use an adhesive to adhere a collection lens, as described above, in a fixed position in front of a light sensor of the reader. However, the collection lens must be optically and physically positioned with a high degree of accuracy relative to the sensor. This is difficult to achieve economically when an adhesive is employed. A manufacturer is not likely to use an uneconomic, large-sized reader, especially in an apparatus with little room to spare.

SUMMARY OF THE INVENTION

One feature of this invention resides, briefly stated, in an assembly for, and a method of, collecting light from indicia. The assembly is advantageously employed in an imaging reader for electro-optically reading indicia, such as bar code symbols, by capturing illumination and/or ambient light reflected or scattered from the symbols with an array of image sensors, or in a moving beam reader for electro-optically reading indicia, again such as bar code symbols, by scanning the symbols with a laser beam, and by detecting laser light reflected or scattered from the symbols.

The assembly comprises a chassis having a port through which the light from the indicia passes, and walls bounding an interior compartment. A self-retaining frame constituted of a light-transmissive optical material having optical power is non-adhesively mounted within the compartment in an assembled position. The frame has an integral collection lens optically aligned with the port in the assembled position for optically modifying the light passing through the port, and a plurality of legs in gripping engagement with the walls in the assembled position. A sensor, such as a solid-state one- or two-dimensional imager or a photodiode, is optically aligned with the lens, for sensing the light optically modified by the lens.

In accordance with one feature of this invention, a single collection lens of fixed focus is assembled with a high degree of accuracy relative to the sensor, without adhesives, and retains itself in the assembled position. This reduces assembly and manufacturing costs and promotes the use of the reader as a miniature component in a non-stand-alone apparatus, such as the coffee maker described above, or a myriad of other apparatuses, such as a telephone, mobile computer, or the like where space is at a premium.

In a preferred embodiment, the port is an opening extending through the chassis, and the chassis includes an annular collar coaxial with the opening and extending into the compartment. The collar surrounds and receives the lens in the assembled position with a mechanical clearance to avoid deforming and changing the optical properties of the lens during assembly.

Preferably, the frame resembles a sawhorse and includes a cross beam extending linearly along a longitudinal direction. The lens extends from the beam. The legs are splayed and diverge from the beam in a direction transverse to the longitudinal direction. At least some of the legs yield resiliently from an initial unstressed condition during insertion of the frame into the chassis to a stressed condition in the assembled position, thereby anchoring the frame within the compartment due to the constant urging of the legs against the compartment walls back to the initial condition. The frame includes reinforcement sections integral with the beam and others of the legs, for reinforcing the other legs to prevent their breakage.

The chassis includes abutments extending into the compartment, for abutting the beam in the assembled position to limit how far the frame is inserted into the compartment. A printed circuit board is assembled to the chassis, for supporting the sensor. The chassis has pegs, and the board has holes for receiving the pegs in the assembled position. The legs contact the board in the assembled position and maintain the lens at a predetermined distance from the sensor.

The method of collecting light from indicia, includes the steps of passing the light from the indicia through a port in a chassis having walls bounding an interior compartment, self-retaining a frame constituted of an optical material by non-adhesively mounting the frame within the compartment in an assembled position, integrating a lens with the frame for optically modifying the light passing through the port in the assembled position, integrating legs with the frame for gripping engagement with the walls in the assembled position, and sensing the light optically modified by the lens with a sensor optically aligned with the lens.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
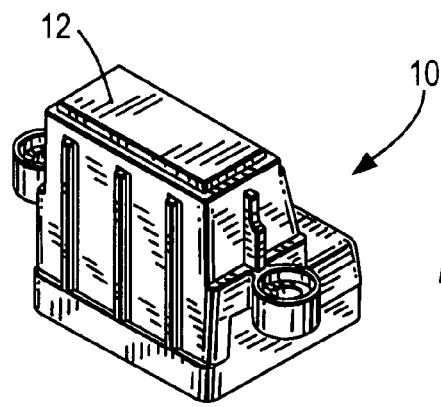
FIG. 1 is a perspective view of an imaging reader for reading indicia in which a light collection assembly in accordance with this invention is employed.

Reference numeral 10 in FIG. 1 generally identifies a data capture system or an electro-optical imaging reader for electro-optically reading indicia, such as bar code symbols, by capturing illumination and/or ambient light reflected or scattered from the symbols with an array of image sensors. In use, an operator presents each symbol to be read to a window 12. The reader 10 can be used as a stand-alone device, but has been especially designed herein to be portable, miniature, lightweight and inexpensive so that it can be readily installed as a subsidiary component in an apparatus operative for performing other functions.

Figure 2:
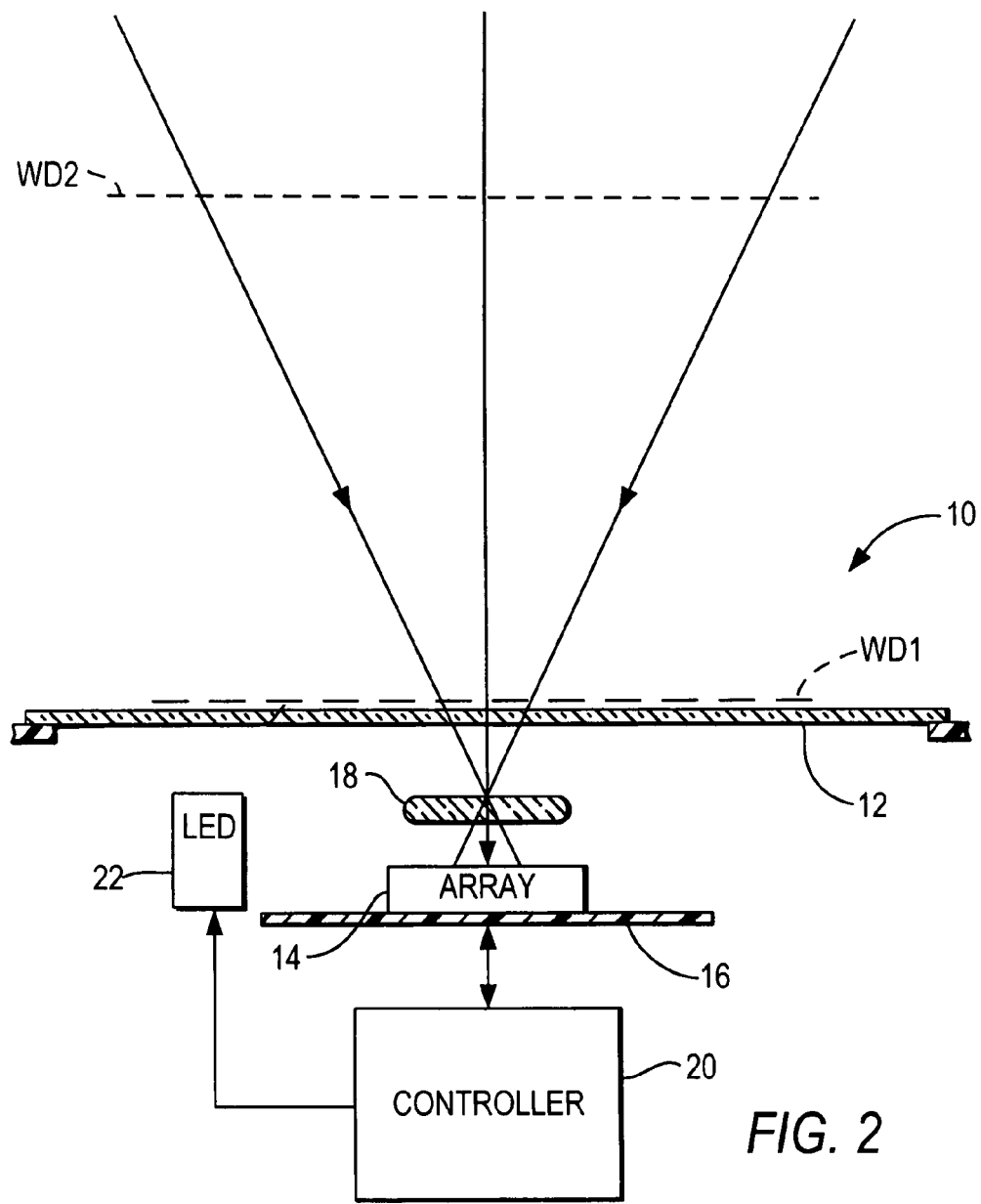
FIG. 2 is a block circuit diagram of various components of the imaging reader of the type shown in FIG. 1.

As shown in FIG. 2, the imaging reader 10 includes an imager 14 supported on a printed circuit board 16 and a focusing collection lens 18 in front of the imager. The imager 14 is a solid-state device, for example, a CCD or a CMOS device and preferably has a linear array of addressable image sensors operative for sensing light passing through the window 12 and captured by the lens 18. The light is reflected or scattered from a target symbol, for example, a one-dimensional symbol, over a field of view and located in a working range of distances between a close-in working distance (WD1) and a far-out working distance (WD2). In a preferred embodiment, WD1 is about one inch from the imager array 14 and generally coincides with the window 12, and WD2 is about two inches from the window 12. An illuminator is also mounted in the reader and preferably includes a light source, e.g., a light emitting diode (LED) 22, to illuminate the target symbol especially in a dimly lit environment where ambient light is insufficient for the reader to operate.

As also shown in FIG. 2, the imager 14 and the LED 22 are operatively connected to a controller or microprocessor 20 operative for controlling the operation of these components. Preferably, the microprocessor is the same as the one used for decoding the light from the symbol and for processing the captured target symbol images.

In operation, the microprocessor 20 sends a command signal to the LED 22 to pulse the LED for a short time period of 500 microseconds or less, and energizes the imager 14 to collect light captured by the lens 18 from the symbol substantially only during said time period. A typical array needs about 33 milliseconds to read the entire target image and operates at a frame rate of about 30 frames per second. The array may have on the order of one thousand, preferably 1500, addressable image sensors.

Figure 3:
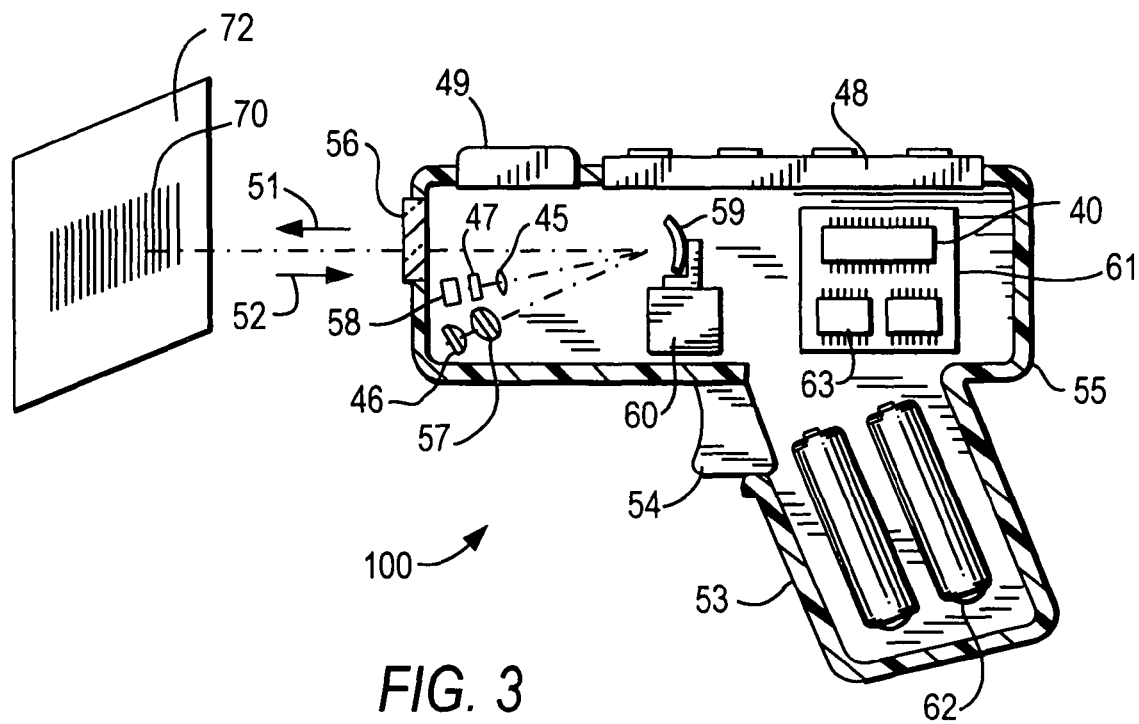
FIG. 3 is a diagrammatic view of a portable electro-optical moving beam reader in which a light collection assembly in accordance with this invention is employed.

As an example of another type of data capture system or reader in which the present invention may be used, reference numeral 100 in FIG. 3 generally identifies a portable handheld moving beam reader for electro-optically reading bar code symbols. The reader 100 is preferably implemented as a gun-shaped device, having a pistol-grip handle 53. A lightweight plastic housing 55 contains a light source 46, a light sensor 58, a focusing lens 57, signal processing circuitry 63, a programmed controller or microprocessor 40, and a power source or battery pack 62. An operator aims the reader at a bar code symbol 70 on a target 72. An exit window 56 at a front end of the housing 55 allows an outgoing light beam 51 to exit and incoming return light 52 scattered or reflected from the symbol to enter.

The focusing lens 57 focuses the light beam 51 into a scanning spot at an appropriate reference plane. The light source 46, such as a semiconductor laser diode, introduces a light beam into an optical axis of the lens 57. The beam is reflected from an oscillating mirror 59 that is coupled to a scanning drive motor 60 energized when a trigger 54 is manually pulled. The oscillation of the mirror 59 causes the outgoing beam 51 to scan back and forth in a desired pattern, such as a scan line or a raster pattern of scan lines, across the symbol.

The return light 52 reflected or scattered back by the symbol passes back through the window 56 for transmission to the sensor 58, preferably a photodiode. The return light reflects off the mirror 59, is captured by a light collection lens 45, passes through an optical bandpass filter 47, and impinges on the sensor 58. The filter 47 is designed to have a bandpass characteristic in order to pass the captured return laser light and block the light coming from other optical sources. The sensor 58 produces an analog signal proportional to the intensity of the captured return light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars of the symbol. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination. A keyboard 48 and a display 49 may advantageously be provided on a top wall of the housing for ready access thereto.

To scan the symbol, the operator aims the bar code reader 100 and operates the movable trigger switch 54 to activate the light source 46, the scanning motor 60 and the signal processing circuitry. If the scanning light beam 51 is visible, the operator can see a scan pattern on the surface on which the symbol appears and adjust aiming of the reader 100 accordingly. If the light beam 51 produced by the source 46 is marginally visible, an aiming light may be included. The aiming light, if needed, produces a visible light spot that may be fixed, or scanned just like the laser beam 51. The operator employs this visible light to aim the reader at the symbol before pulling the trigger.

Figure 7:
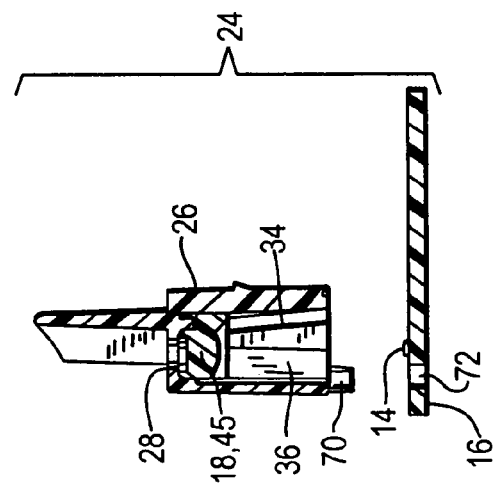
FIG. 7 is an exploded side sectional view of the components of FIG. 6 during assembly.
Figure 6:
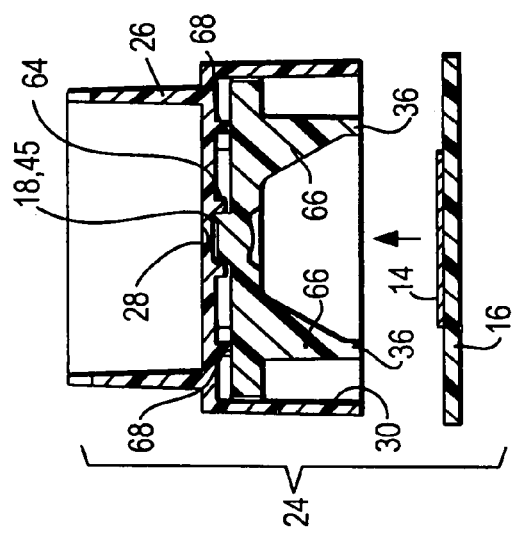
FIG. 6 is an exploded sectional view of the components of FIG. 5 during assembly, but with a lens inserted in the chassis.
Figure 5:
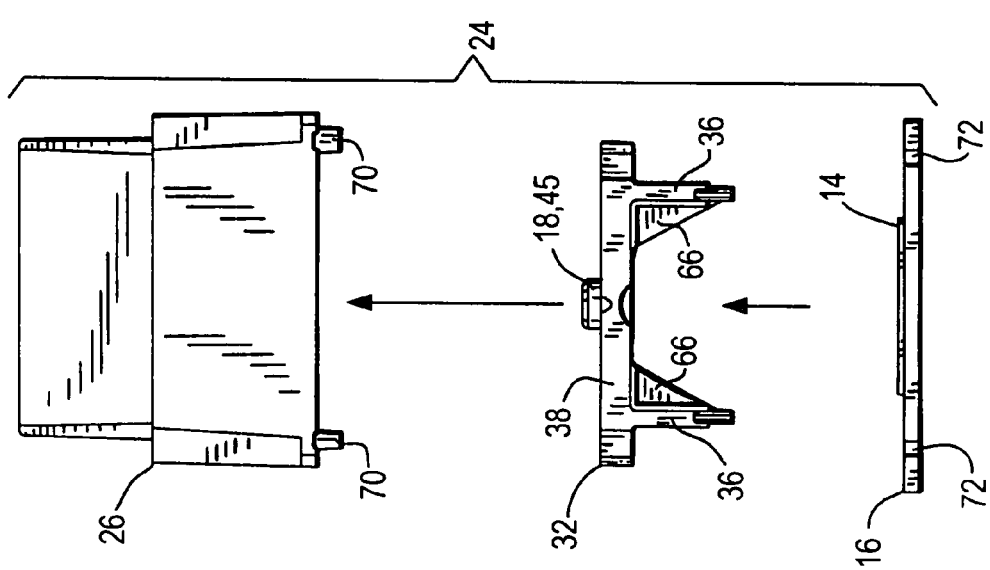
FIG. 5 is an exploded front elevational view of the frame of FIG. 4 for assembly with a chassis and a printed circuit board of the light collection assembly.

In accordance with one feature of this invention, the collection lens 18 of FIG. 2 or the collection lens 45 of FIG. 3 is a single collection lens of fixed focus and is assembled in an assembled position in a light collection assembly 24 (see FIGS. 5-7) with a high degree of accuracy relative to the sensor 14 of FIG. 2 or the sensor 58 of FIG. 3, respectively, without adhesives, and each collection lens 18, 45 retains itself in the assembled position.

Figure 4:
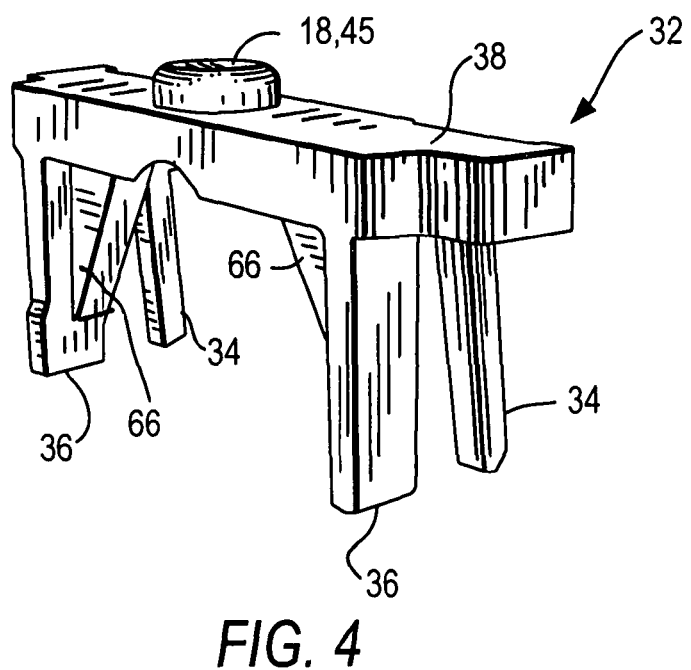
FIG. 4 is a perspective view of a frame for use in a light collection assembly in accordance with this invention.

The light collection assembly 24 comprises a chassis 26 of molded one-piece construction and has a port 28 through which the light from the symbol passes along an optical axis, and walls bounding an interior compartment 30. A self-retaining frame 32 shown in isolation in FIG. 4 is constituted of a light-transmissive, optical material having optical power and is non-adhesively mounted within the compartment 30 in the assembled position shown in FIGS. 6-7. The frame 32 is of molded one-piece construction and has an integral collection lens 18, 45 optically aligned with the port 28 along the optical axis in the assembled position for optically modifying the light passing through the port 28, and a pair of rear legs 34 and a pair of front legs 36, all the legs being in gripping engagement with the compartment walls in the assembled position. A sensor, such as the solid-state imager 14 or the photodiode 58, is optically aligned with the lens 18, 45 along the optical axis, for sensing the light optically modified by the lens.

In a preferred embodiment, the port 28 is an opening extending through the chassis 26, and the chassis 26 includes an annular collar 64 coaxial with the opening and extending into the compartment 30. The collar 64 surrounds and receives the lens 18, 45 in the assembled position with a mechanical clearance to avoid deforming and changing the optical properties of the lens during assembly. The opening is formed during molding of the chassis by the shut-off system.

Preferably, the frame 32 resembles a sawhorse and includes a cross beam 38 extending linearly along a longitudinal direction. The lens 18, 45 extends upwardly from the beam 38. The legs 34, 36 are splayed and diverge from the beam 38 in a direction transverse to the longitudinal direction. The rear legs 34 are thinner than the front legs 36 and therefore more readily yield resiliently from an initial unstressed condition (see FIG. 4) during insertion of the frame 32 into the chassis 26 to a stressed condition (see FIG. 7) in the assembled position, thereby anchoring the frame 32 with an interference fit within the compartment 30 due to the constant urging of the legs 34 against the compartment walls back to the initial condition. The frame 32 includes reinforcement sections 66 integral with the beam 38 and the front legs 36, for reinforcing the front legs 36 to prevent their breakage.

The chassis 26 includes abutments 68 extending into the compartment 30, for abutting the beam 38 in the assembled position to limit how far the frame 32 is inserted into the compartment 30. The printed circuit board 16 is assembled to the chassis 26, for supporting the sensor 14, 58. The chassis 26 has pegs 70, and the board 16 has holes 72 for receiving the pegs 70 in the assembled position. The legs 34, 36 contact the board 16 in the assembled position and maintain the lens 18, 45 at a predetermined distance or height from the sensor 14, 58.

Thus, a single collection lens of fixed focus is assembled with a high degree of accuracy relative to a sensor, without adhesives, and retains itself in the assembled position. This reduces assembly and manufacturing costs and promotes the use of the reader either as a stand-alone system, or as a miniature component in a non-stand-alone apparatus, such as the coffee maker described above, or a myriad of other apparatuses, such as a telephone or mobile computer.

It will be understood that each of the elements described above, or two or more together, also may find a useful application in other types of constructions differing from the types described above.

While the invention has been illustrated and described as embodied in a light collection assembly in an electro-optical reader and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An assembly for collecting light from indicia, comprising:
   a chassis having a port through which the light from the indicia passes, and walls bounding an interior compartment;
   a self-retaining frame constituted of an optical material and non-adhesively mounted within the compartment in an assembled position, the self-retaining frame having an integral lens optically aligned with the port in the assembled position for optically modifying the light passing through the port, and legs in gripping engagement with the walls in the assembled position; and
   a sensor optically aligned with the lens, for sensing the light optically modified by the lens.

2. The assembly of claim 1, wherein the port is an opening extending through the chassis, wherein the chassis includes an annular collar coaxial with the opening and extending into the compartment, and wherein the collar surrounds and receives the lens in the assembled position.

3. The assembly of claim 1, wherein the self-retaining frame includes a cross beam from which the lens extends, and wherein the chassis includes abutments extending into the compartment, for abutting the beam in the assembled position.

4. The assembly of claim 1, and a printed circuit board assembled to the chassis, for supporting the sensor.

5. The assembly of claim 4, wherein the chassis has pegs, and wherein the board has holes for receiving the pegs in the assembled position.

6. The assembly of claim 4, wherein the legs contact the board in the assembled position and maintain the lens at a predetermined distance from the sensor.

7. The assembly of claim 1, wherein the sensor is a solid-state imager for capturing the light optically modified by the lens.

8. The assembly of claim 1, wherein the self-retaining frame includes a cross beam extending along a longitudinal direction, and wherein the legs diverge in a direction transverse from the longitudinal direction away from the beam.

9. The assembly of claim 8, wherein the self-retaining frame includes reinforcement sections integral with the beam and the legs, for reinforcing the legs.

10. The assembly of claim 1, wherein the legs are splayed.

11. An electro-optical reader for capturing light from indicia, comprising:
   a housing having a window; and
   an assembly in the housing, for collecting the light from the indicia passing through the window, the assembly including
      a chassis having a port through which the light through the window passes, and walls bounding an interior compartment;
      a self-retaining frame constituted of an optical material and non-adhesively mounted within the compartment in an assembled position, the self-retaining frame having an integral lens optically aligned with the port in the assembled position for optically modifying the light passing through the port, and legs in gripping engagement with the walls in the assembled position; and
      a sensor optically aligned with the lens, for sensing the light optically modified by the lens.

12. An assembly for collecting light from indicia, comprising:
   chassis means having port means through which the light from the indicia passes, and wall means bounding an interior compartment;
   self-retaining frame means constituted of an optical material and non-adhesively mounted within the compartment in an assembled position, the self-retaining frame means having an integral lens means optically aligned with the port means in the assembled position for optically modifying the light passing through the port means, and leg means in gripping engagement with the wall means in the assembled position; and
   sensor means optically aligned with the lens means, for sensing the light optically modified by the lens means.

13. A method of collecting light from indicia, comprising the steps of:
   passing the light from the indicia through a port in a chassis having walls bounding an interior compartment;
   self-retaining frame constituted of an optical material by non-adhesively mounting the frame within the compartment in an assembled position;
   integrating a lens with the frame, for optically modifying the light passing through the port in the assembled position;
   integrating legs with the frame, for gripping engagement with the walls in the assembled position; and
   sensing the light optically modified by the lens with a sensor optically aligned with the lens.

14. The method of claim 13, and forming the port as an opening extending through the chassis, and forming the chassis with an annular collar coaxial with the opening and extending into the compartment, and surrounding and receiving the lens with the collar in the assembled position.

15. The method of claim 13, and forming the frame with a cross beam from which the lens extends, and forming the chassis with abutments extending into the compartment, for abutting the beam in the assembled position.

16. The method of claim 13, and supporting the sensor with a printed circuit board assembled to the chassis.

17. The method of claim 16, and forming the chassis with pegs, and forming the board with holes for receiving the pegs in the assembled position.

18. The method of claim 16, and maintaining the lens at a predetermined distance from the sensor by having the legs contact the board in the assembled position.

19. The method of claim 13, and forming the sensor as a solid-state imager for capturing the light optically modified by the lens.

20. The method of claim 13, and forming the frame with a cross beam extending along a longitudinal direction, and forming the legs to diverge in a direction transverse from the longitudinal direction away from the beam.

21. The method of claim 20, and forming the frame with reinforcement sections integral with the beam and the legs, for reinforcing the legs.

22. The method of claim 13, and splaying the legs.

* * * * *